(12) United States Patent
Rubin et al.

(10) Patent No.: US 7,606,706 B1
(45) Date of Patent: Oct. 20, 2009

(54) SYSTEM AND METHOD FOR STORAGE AND RETRIEVAL OF PERSONAL COMMUNICATIONS IN A BROADBAND NETWORK

(76) Inventors: Aviel D. Rubin, 1 Rubino Rd., W. Caldwell, NJ (US) 07006; Martin J. Strauss, 7 Oak Forest La., Summit, NJ (US) 07901-1716

( * ) Notice: Subject to any disclaimer, the term of this patent is extended or adjusted under 35 U.S.C. 154(b) by 0 days.

(21) Appl. No.: 09/553,361

(22) Filed: Apr. 20, 2000

(51) Int. Cl.
*G10L 15/26* (2006.01)
*H04M 1/64* (2006.01)

(52) U.S. Cl. .................................... 704/235; 379/88.01

(58) Field of Classification Search ................. 704/235; 379/88.01–88.04
See application file for complete search history.

(56) References Cited

U.S. PATENT DOCUMENTS

| | | | | |
|---|---|---|---|---|
| 4,625,081 A * | 11/1986 | Lotito et al. | ............. | 379/88.26 |
| 5,216,603 A * | 6/1993 | Flores et al. | ................... | 704/1 |
| 5,479,411 A | 12/1995 | Klein | ....................... | 370/110.1 |
| 5,511,112 A | 4/1996 | Szlam | ......................... | 379/88 |
| 5,608,786 A | 3/1997 | Gordon | ....................... | 379/100 |
| 5,949,876 A * | 9/1999 | Ginter et al. | ................... | 705/80 |
| 5,982,857 A | 11/1999 | Brady | ..................... | 379/88.19 |
| 6,069,940 A * | 5/2000 | Carleton et al. | .......... | 379/88.04 |
| 6,157,705 A * | 12/2000 | Perrone | ................... | 379/88.01 |
| 6,161,137 A * | 12/2000 | Ogdon et al. | ............... | 709/224 |
| 6,167,395 A * | 12/2000 | Beck et al. | ..................... | 707/3 |
| 6,170,011 B1 * | 1/2001 | Macleod Beck et al. | ..... | 709/224 |
| 6,173,279 B1 * | 1/2001 | Levin et al. | ..................... | 707/5 |
| 6,192,338 B1 * | 2/2001 | Haszto et al. | ............... | 704/257 |
| 6,230,197 B1 * | 5/2001 | Beck et al. | ................... | 709/223 |
| 6,330,308 B1 * | 12/2001 | Cheston et al. | .......... | 379/88.04 |
| 6,381,640 B1 * | 4/2002 | Beck et al. | ................... | 709/223 |
| 6,393,107 B1 * | 5/2002 | Ball et al. | ................ | 379/88.13 |
| 6,408,272 B1 * | 6/2002 | White et al. | ............. | 704/270.1 |
| 6,427,140 B1 * | 7/2002 | Ginter et al. | ................... | 705/80 |
| 6,445,694 B1 * | 9/2002 | Swartz | ....................... | 370/352 |
| 6,473,794 B1 * | 10/2002 | Guheen et al. | .............. | 709/223 |
| 6,519,571 B1 * | 2/2003 | Guheen et al. | .............. | 705/14 |
| 6,536,037 B1 * | 3/2003 | Guheen et al. | .............. | 717/151 |
| 6,606,744 B1 * | 8/2003 | Mikurak | ..................... | 717/174 |
| 6,633,878 B1 * | 10/2003 | Underwood | ................ | 707/100 |
| 6,704,873 B1 * | 3/2004 | Underwood | ................. | 726/12 |
| 6,987,841 B1 * | 1/2006 | Byers et al. | .............. | 379/88.17 |
| 7,133,845 B1 * | 11/2006 | Ginter et al. | ................... | 705/51 |
| 7,382,869 B2 * | 6/2008 | Smith | .................... | 379/207.02 |
| 7,401,148 B2 * | 7/2008 | Lewis | ......................... | 709/228 |
| 7,409,449 B2 * | 8/2008 | Koch et al. | ................. | 709/225 |
| 7,450,702 B2 * | 11/2008 | Solin | ..................... | 379/100.01 |

* cited by examiner

*Primary Examiner*—Michael N Opsasnick (57) ABSTRACT

A mechanism is provided to build and maintain a searchable database of communication content and related indicia information of all voice and multimedia (audio and video) communications in which a person participates using a broadband communication system. A personal communication module may be coupled to a user's communication device and a broadband communication network for capturing data and performing voice recognition associated with a communication. Data may be stored in a database and searched including, for example, keywords from the communications, date, time, number, etc.

7 Claims, 7 Drawing Sheets

| | 505 | |
|---|---|---|
| | KEYWORD PREFERENCE SCREEN | |
| 510 — System Selected Keyword (As Amended) | | Manuel Keyword Entry — 520 |

| System Selected Keyword (As Amended) | | Manuel Keyword Entry |
|---|---|---|
| 1. Loan | 22 | Enter Keyword: [Boat] |
| 2. Finance | 12 | Priority/Weight [1] |
| 3. Checking Account | 9 | |
| 4. Money | 6 | Subject/Title [Boat loan Application] |
| 5. Bank | 5 | |
| [OK] [Edit] [Enter] | | Name(s) [ ] |

530 — Communication:
  Date: 5/1/01          Directory Number: 973-555-0101
  Times: 11:00–11:45 AM  System Address: ATT0011950.com

COMMUNICATION DATABASE SEARCH SCREEN (705)

Enter:

- 710 — Keyword(s): Boat
- 711 — Date Range:
- 712 — Directory No.:
- 713 — System Address:
- 714 — Type: Telephone Call
- 715 — Subject/Title:

FIG. 8

| SUBJECT/TITLE | DATE | TIME | DIRECTORY NO. | SYSTEM ADDRESS | KEYWORDS |
|---|---|---|---|---|---|
| 1. Boat Loan Application | 5/01/01 | 11:00 AM | 973-555-0101 | ATT0011950.com | Boat, ... |
| 2. Boat Dock Fees | ... | ... | ... | ... | Boat, ... |
| 3. Billy Clinton Party | ... | ... | ... | ... | Boat, ... |
| 4. Boat Fuel | ... | ... | ... | ... | Boat, ... |
| 5. Truck Repair | ... | ... | ... | ... | Repair, Boat, .. |

CHANGE PRESENTATION MEDIA ? (805)

SYSTEM AND METHOD FOR STORAGE AND RETRIEVAL OF PERSONAL COMMUNICATIONS IN A BROADBAND NETWORK

FIELD OF THE INVENTION

The present invention relates to communication between users in communication systems, and more particularly, to providing a database of personal communications in a communication system including broadband communications.

BACKGROUND OF THE INVENTION

Present day telephony networks typically have end-to-end networks built around circuit switches, end offices, a toll network, tandem switches, and twisted wires. These networks are commonly referred to as a public switched telephone network (PSTN) or plain old telephone service (POTS). Due to bandwidth limitations of plain old telephone service (POTS), there is an inherent inability to efficiently integrate multiple types of media such as telephony, data communication for personal computers (PC), and television (TV) broadcasts. Further, the type of customer services and feature/function capability that may be implemented in a PSTN is somewhat limited relative to a broadband communication system. Accordingly, new broadband architectures are developing which transmit voice, data, and multimedia (video and audio) communications using, for example, communication information packets. These communication packets may be constructed in one or more packet protocols such as Internet Protocol (IP) or Asynchronous Transfer Mode (ATM). These new architectures gives rise to a new array of user services and capabilities not previously available with PSTN. One such new service and system capability of a packet based broadband communication system is provided by the present application for indexed database of personal communications.

Present PSTN voice mail systems do not readily provide a method that enables a caller to build and maintain a searchable database of all communications that a person participates in, including voice and multimedia (video and audio) communications. Further, present PSTNs voice mail systems do not automatically include the digital representation of the message left that would readily enable saving and searching either one, or both, communications to and from a communication device. For example, in the present PSTN networks if a telephone call is recorded then both parties voice communications will be recorded whether both parties approve or not. Nor can the present PSTN support segregating portions of a multimedia communication. Thus, in general, the present PSTN infrastructure will not support creation and manipulation of an indexed database of personal communications. However, with the development of packet based broadband communication systems, such a database of voice and multimedia communications is possible to implement. An indexed database of personal communications represents a value to consumers as a means to enable a system user to readily create and quickly search a database of personal communications for any information he/she needs.

SUMMARY OF THE INVENTION

The present invention is directed to a mechanism to build and maintain a storage and retrieval means for communication content and related indicia information (e.g., meta data) of voice, multimedia (audio and video), and/or instant message (IM) communication sessions that a person participates in while using a broadband communication system. Voice and multimedia communication traffic being carried in digital form, such as in information packets, enables retention and sorting of the information packets according to such things as date, time, party identification, and communication content, so that a communication device user can readily search through a database of prior communication session(s), identify a communication session of interest, and review the communication session for content. This may be accomplished by use of a personal communication store and recall module, either physical or logical, that may be coupled to or integral to the user's communication device (e.g., a telephone) and/or a broadband communication network. The module may capture all data associated with a communication session and perform voice recognition on the voice or audio content of the communication, storing the content in a database for future reference. The communication data including text of the voice or audio content of the communication may then be searched based on related data, keywords or any word(s) spoken during the communication session. In one variation of the invention, artificial intelligence may be used to identify and log the main keywords in the conversation. The module may store all of the content of the various communication sessions, such as telephone conversations, in a database along with related data about the communication session, e.g., the date, the time, the directory number, the system address, and the identity of the other endpoint or party. In addition, an index may be created using the system identified keywords and/or identification (ID) text.

In another variation, the module may operate to store less than all parts of a multi-party communication session when one of the parties does not pre-approve of his/her contribution to the communication session being recorded. For example, the stored content of a telephone conversation may be limited to only the words of the calling party or called party (both parties may record his/her own side of the communication) if one or more of the parties to the telephone call will not agree to the storing of his portion of the conversation. In this case, the communication store and recall module will store only information packets, e.g., IP packets, which are outbound from the retaining party's own communication device. Thus, the user would build a record in his/her own database which contains only his/her own side of the communication session and related data.

In a further variation of the invention, a mechanism may be included to allow users to record all parts of a communication session, e.g., a telephone conversation, by getting permission from the other party or parties to the communication session. Often, the law requires that a party must be notified if a communication session, e.g., a telephone conversation, is being recorded (e.g., stored in memory). The mechanisms enables control of a parties approval to record a communication session. In a first approach for a two-party communication, each party can initially enter an approval code which enables the stored communications module to store both sides (incoming and outgoing parts) of a communication session from the very beginning of the communication session. This approval code may be spoken or entered via a keyboard or keypad on a communication device. In another approach, both sides of the two-way communication are also stored in the database, one unprotected (outgoing communications of a transmitting party) and one protected (incoming communications to the transmitting party from some other party). In this case, the digitized and packetized communications (e.g., words spoken) of the transmitting party, sending one side of the communications, are stored in an unprotected manner. However, the digitized and packetized communications (e.g., words spoken) received by the transmitting party from some other party are encoded using encryption, and the other party originating this side of the communications may be given the only copy of an encryption key for decoding the encrypted information packets. If at some point, a system user wishes to recall the other side's portion of the communication, he can request the key from the other party, and therewith decode the encrypted portion of the communication session. Thus, the entire communication session may be retained in an indexed database of personal communications and either all parts or sides of the multi-way communication are unprotected or only the side of the communications originating form the system user for whom the database is being created are stored unprotected and the other side(s) of the communications received from other parties are stored protected.

In a still further variation of the invention, the module may include an interactive portion which enables the user to actively or interactively determine particular keywords that he/she may later use to search and find a stored communication. After each communication, the user may be given, either automatically of manually, the choice to enter keywords or make changes to system selected keywords and related data initially selected by the system, so as to assist in indexing the communications. Once a communication is saved in the database and the keywords and/or meta data established, the user may search it whenever he/she wishes to review something in or about a communication that he/she previously had with another party(s).

DESCRIPTION OF THE PREFERRED EMBODIMENTS

The present invention is directed to a mechanism that enables broadband communication system users to build and maintain a searchable storage of communications between the system user and others. In particular, the mechanism may be a personal communication store and retrieval (recall) module which enables a system user to retain, search, and review his/her various communications. This is particularly useful for telephone calls and multimedia (audio and video) calls which until now have either not been retained or have not been retained in a searchable medium. Likewise, the invention may be applied to instant message (IM) communication session and the transcripts of IM sessions would be collected and stored in a manner similar to storing the telephone or multimedia communication sessions.

With the advent of voice traffic being carried in digital form, e.g., in IP packets, communication session information may now be stored in, for example, a searchable database. The key information for storing and retrieving of communication session records in the database may be facilitated using automation such as voice/speech recognition and/or artificial intelligence. Further, the system may determine, based on user approval, whether to store only particular parts of the communication session such as the words of one party but not the words of some other party. The module may be physical, logical, or a combination of both, that is coupled to the user's phone and/or the broadband communication network.

In general, the personal communication store and recall module may capture all data associated with a communication session, e.g., a telephone conversation, and perform voice recognition on the content of the communication session, e.g., conversation. Then using artificial intelligence, for example artificial intelligence software available today, the main keywords in the conversation are identified. One example of an artificial intelligence system and software which may be used is the SMART system from Cornell. The module may store all of the communications, and data related to the communications, such as date, time, directory number, system address, identity of other party(s) of other endpoint(s) in an electronic memory using, for example, a database. In addition, an index may be created using the system generated keywords determined by using artificial intelligence. The module may also enable the system user to enter his/her own keywords or other communication identification (ID) terms.

The module may be mechanized to store only one party's contributions to the communication session or a number of parties contributions to the communication session. If multiple parties contributions are to be stored, the module may be constructed to store incoming communication information packets only when authorized by the party from whom the incoming communication information packets are being sent. So, in some cases, the module may only store outbound packets.

In another variation, incoming communication information packets may be stored in a protected manner, e.g., encrypted, so that a receiving party may subsequently be decoded when approved by the sending party. These features are particularly useful in cases where legal restrictions prevent the recording of telephone and/or multimedia communications. This is possible in the IP world since each persons voice is digitized, packetized, and routed on its own path. Thus, the module builds a database of at least the system user's side of each communication.

In a still further variation, the invention may include an interactive portion so that after each communication the user may manually alter or enter keywords and/or identifications terms, for example at title of the communication session, that will help with the indexing and subsequent searching of the stored communication sessions. Once stored and indexed, the user can search the database whenever he wishes to review something in, or about, a previous communication, by entering particular search terms such as keywords or ID terms.

Figure 1:
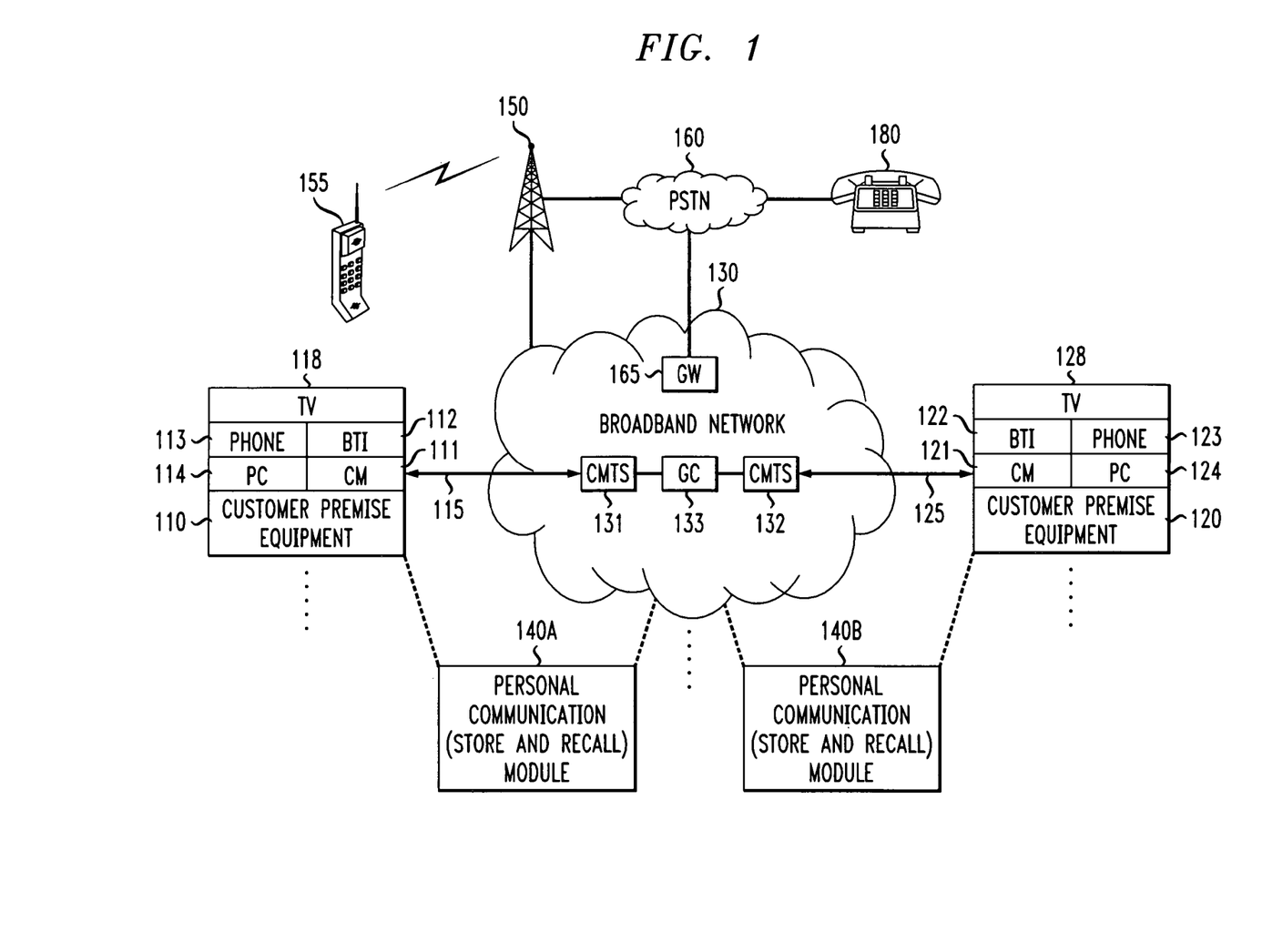
FIG. 1 shows a schematic representation of an exemplary broadband network (e.g., broadband IP based network) in accordance with a preferred embodiment for aspects of the present invention.

One preferred embodiment of a broadband communication system architecture in which the present invention may be implemented is illustrated in FIG. 1. Although the invention will be describe herein using the broadband communication system illustrated in FIG. 1, it is understood that the invention may be implemented in any number of different broadband communication systems or variations of the broadband communication system illustrated in FIG. 1. Some other possible broadband communication system architectures in which the present invention may be implemented include those shown in, for example, U.S. patent application Ser. No. 09/475,292 and U.S. patent application Ser. No. 09/475,293, filed Dec. 30, 1999, hereby incorporated by reference for all purposes. In particular, U.S. patent application Ser. No. 09/475,293 is directed to an activity log for improved call efficiency which may prove useful in supplementing the present invention.

As illustrated in FIG. 1, the broadband communication system may include plurality of customer premise equipment (CPE) 110 and 120 used to interface with a broadband communication system, for example, broadband network 130. The CPEs 110 and 120 may include, for example, a cable modem (CM) 111 and 121 coupled to the broadband network 130 via a communication interface 115 and 125, respectively. The communication interfaces 115 and 125 may be, for example, a coaxial cable, optical fiber, radio waves, etc, as long as it can handle broadband communications. Further, the CPEs 110 and 120 may include a personal computer (PC) 114 and 124, a broadband telephone interface (BTI) 112 and 122, and a telephone (POTS or ISDN), 113 and 123. The cable modem 111 (or 121) and the broadband telephone interface 112 (or 122), may be separate or integral in a single box such as a broadband residential gateway (BRG), and may further include a television interface for interfacing with a TV 118 and 128. Likewise, the CM 111 (or 121) and/or BTI 112 (or 122) may be included in the PC 114 (or 124).

The broadband network 130 may include a plurality of cable modem termination systems (CMTS) 131 and 132 to couple to the plurality of cable modems (e.g., CMs 111 and 121) coupled to the broadband communication system, and one or more gate controllers 133 to coordinate communication traffic throughout the broadband system. The broadband network 130 may be coupled to a cellular communications base station 150. The broadband network 130 may also be coupled to a PSTN 160 via a gateway (GW) 165 and the PSTN 160 coupled to cellular communications base station 150. The radio wave communications base station 150 is coupled via radio waves to one or more mobile communication devices 155. The mobile communication device may be, for example, a digital phone or hand held multimedia communication device such as a laptop or portable PC, or a personal digital assistance (PDA) device, etc., couple to the system with a wireless connection.

The system may further include a plurality of personal communication modules (PCM) 140A and 140B. The PCM 140A and 140B may be physical or logical, or a combination of both. The personal communication module 140A and 140B may be a server and include one or more electronic processors, electronic memory, and operating and application software. The electronic memory may include ROM, RAM, and a magnetic disk drive. The software may contain a database portion, means for providing encryption and encryption keys such as cryptography software, for example, Pretty Good Privacy (PGP) and/or S/MIME (may include RSA), as well as artificial intelligence software for providing system generated keywords, such as in SMART. The personal communication module 140A and 140B, as illustrated, may be coupled to the CPE 110 and 120, respectively, and/or the broadband network 130 via separate interconnects, or may be located along communication links 115 and 125. Alternatively, the personal communication modules 140A and 140B may be included in the CPE 110 and 120 or the broadband network 130 and utilize hardware and software already existing in these mechanisms. For example, the personal communication module might be a logical entity supported by a PC 114 or 124 of the CPE 110 and 120 or by a server (not shown) within the broadband network 130. Likewise, the PCM 140 might be supported by, or integral with, the mobile communication device 155. In any case, one skilled in the art will recognize that a PCM 140 and its related software may be located anywhere in the broadband communication system which will support the feature/function capabilities of processing, storing, and retrieving system user communication sessions that include voice or multimedia communications and may either be integrated in a single device or separated into multiple devices.

Figure 2:
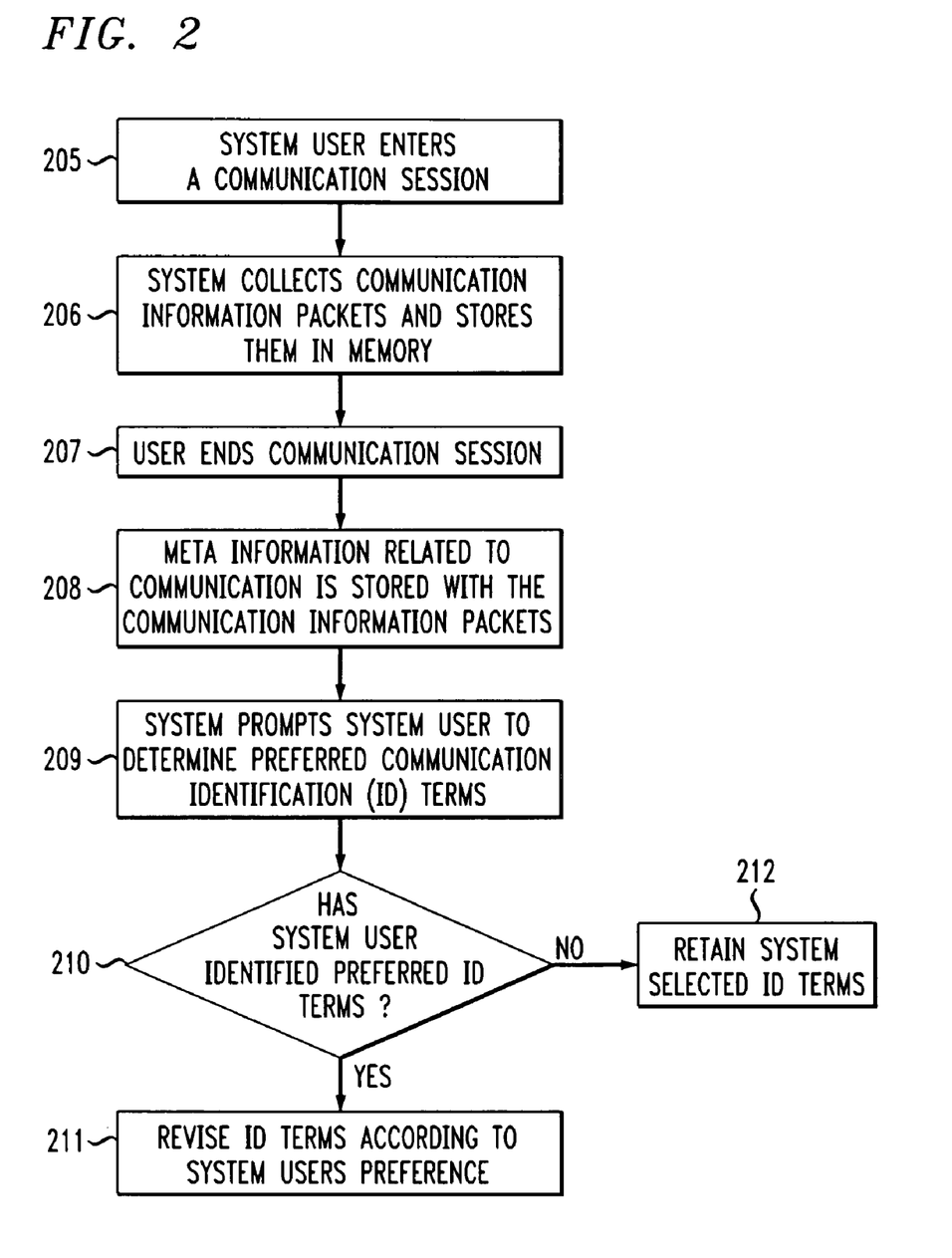
FIG. 2 shows a flow diagram for identifying and storing of meta information and identification terms for a communication session according to a preferred embodiment of the present invention.

Referring now to FIG. 2, a flow diagram illustrating a manner for identifying and storing meta information and identification terms for a stored communication session according to a preferred embodiment of the present invention is provided. First, at step 205, a system user enters a communication session. For example, a system user may make a telephone or multimedia call with CPE 110 to a system user of CPE 120. Alternatively, the system user may make a call from mobile communication unit 155. In any case, once connected, the system, for example the BTIs 112 and 122, digitize and packet the voice or audio sounds and transmits them through broadband network 130 to the other party's CPE, 120 and 110, respectively. At step 206 the system, for example, the personal communication modules 140A and 140B, will collect the communication information packets and store them in memory. The personal communication modules 140A and 140B, respectively, may collect both incoming and outgoing communication information packets or just outgoing communication packets of the respective CPEs 110 and 120. These packets may be stored in electronic memory, for example, cache memory. Next, at step 207, the system user(s) ends the communication session, for example, a telephone or multimedia call.

Then, at step 208, the PCMs 140 stores the collected communication information packets and related meta information to memory, for example in a database on magnetic disk. Meta information may be the time, date, directory number, system address, identity of other party(s) of other endpoint(s), etc. The system will convert the stored digital voice packets into text using voice/speech recognition and then automatically determine a group of system selected keywords for search and ID terms for the communication session (see FIG. 3). The system, for example the PCMs 140A and 140B in conjunction with respective CPEs 110 and 120, will prompt the system user(s) to determine preferred communication session identification (ID) terms, at step 209. (See for example the graphical user interface (GUI) illustrated in FIG. 5.) At decision step

210, the system determines if the system user(s) has identified preferred ID terms. If not, at step 212, the system retains the system selected ID terms to be associated with a communication session. If so, at step 211, the system revises the system selected terms according to the system user(s) preferences and associates them with the communication session.

Figure 3:
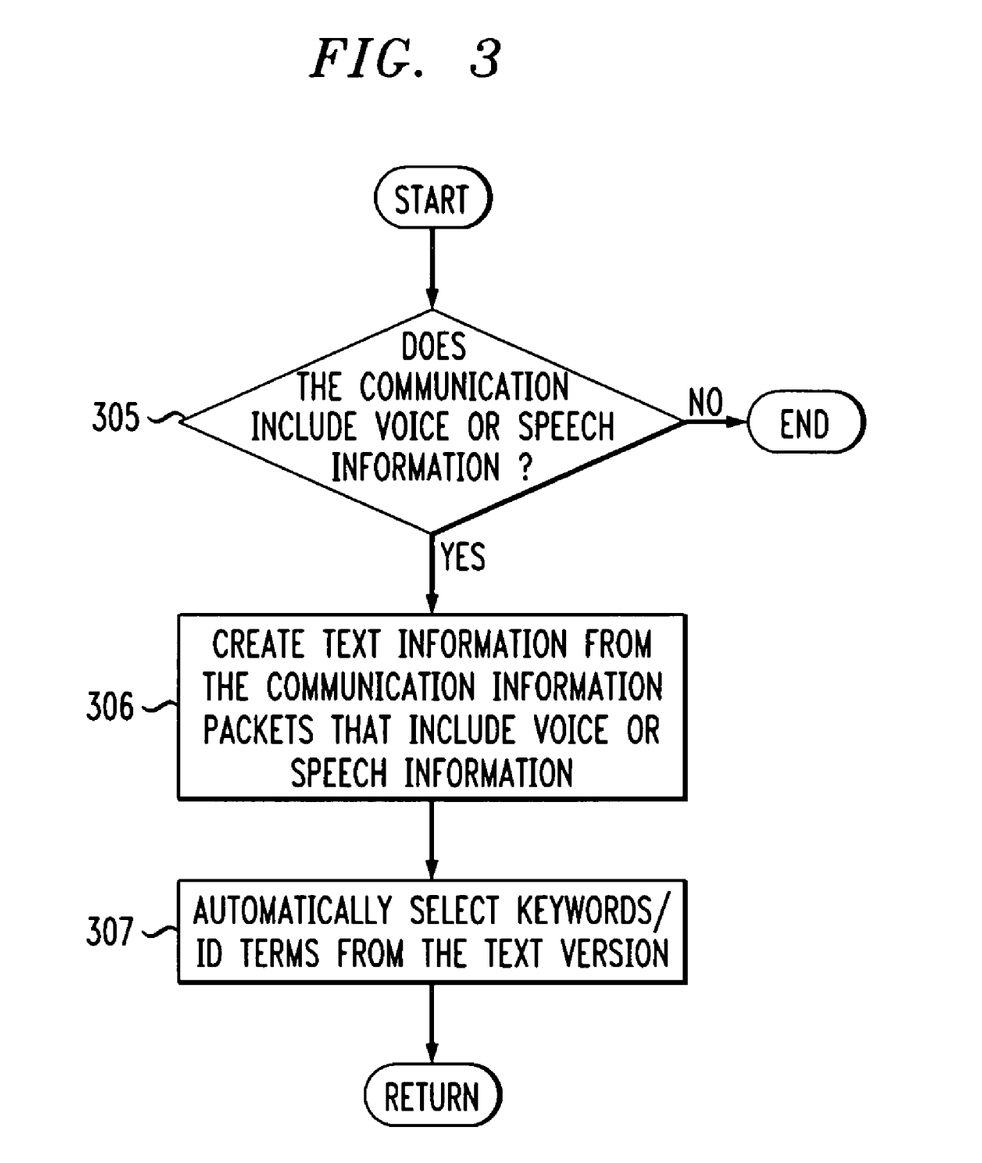
FIG. 3 shows a flow diagram for automatically determining keywords and/or ID terms of a communication session according to a preferred embodiment of the present invention.

As previously indicated, the system may convert the communication session information packets to text and automatically select various keywords/ID terms for the communication session. Referring now to FIG. 3, a flow diagram for automatically determining keywords and/or ID terms of a communication session according to a preferred embodiment of the present invention is illustrated. This may occur at, for example, steps 208 or 209, or somewhere in between (see FIG. 1). First, the system, for example the PCM 140A and 140B or the CPE 110 and 120, determine whether the communication session information packets includes voice or speech information at decision step 305. If so, at step 306, the system creates text information from the communication session information packets which may have been stored as a record in a database. This text information may be created using voice/speech recognition and the results may be stored as a text file associated with the communication session information packets. This text file may be searchable. Then, at step 307, the system automatically selects keywords/ID terms from the text. The system may use, for example, artificial intelligence, to determine which words or phrases to select as keywords/ID terms for the communication session information packets.

Further, the system will store communication session information packets for either only packets outgoing from the system user's communication device (e.g., CPE 110 or 120, mobile communication device 155, etc.) or for both outgoing and incoming information packets. This may occur at, for example, step 208 (see FIG. 1). If incoming information packets are to be stored, then the system may be capable of protecting the incoming information packets so that the packets can only be accessed after the originating party approves the access.

Figure 4:
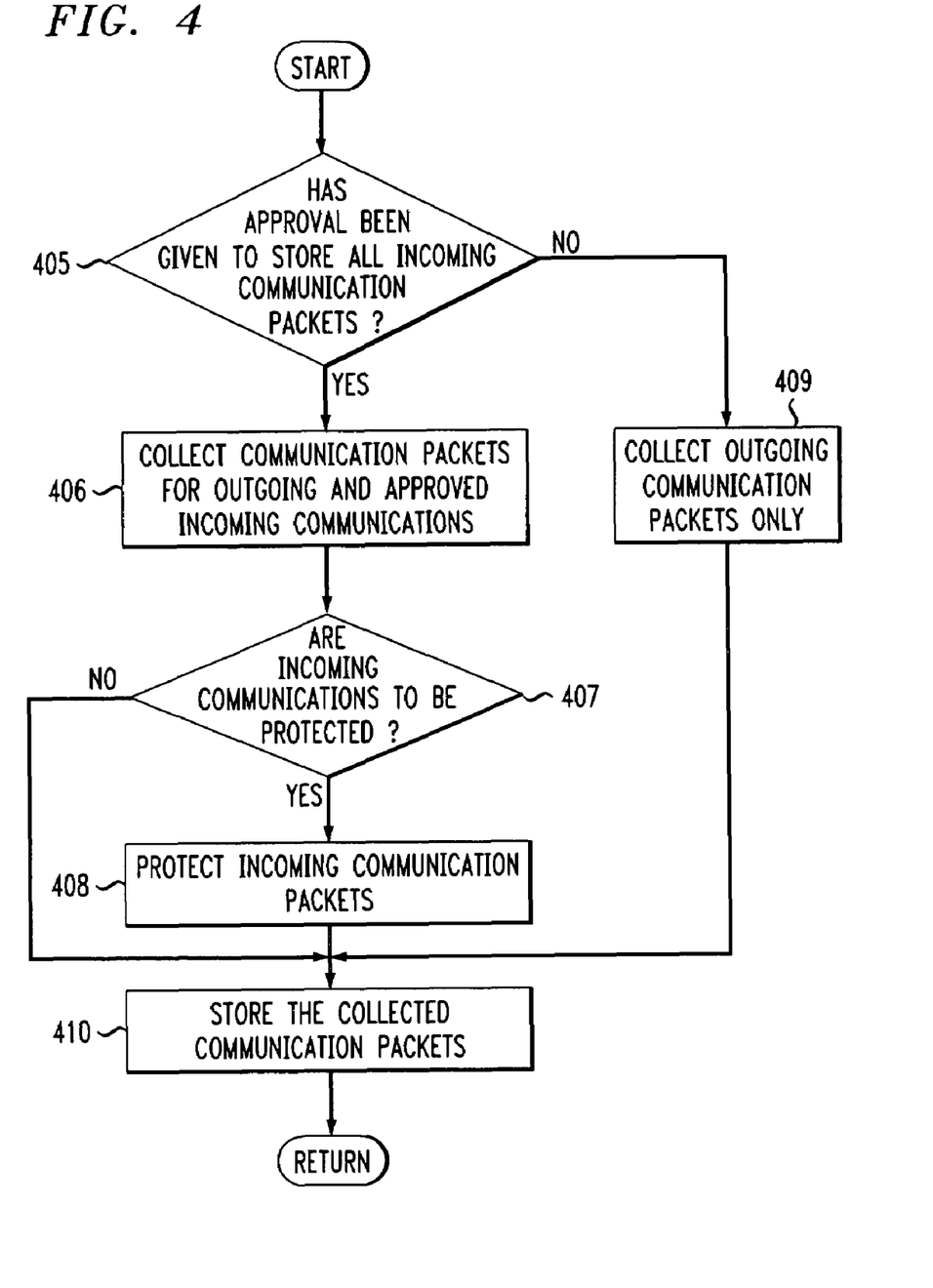
FIG. 4 shows a flow diagram for determining what parts of a communication session will be stored and whether to protect or not protect an incoming portion of a communication session according to a preferred embodiment of the present invention.

Referring to FIG. 4, a flow diagram for determining whether only outgoing communications or incoming and outgoing communications will be stored and whether incoming communication will be protected or not protected for a communication session according to a preferred embodiment of the present invention is illustrated. First, at decision step 405, the system, for example the PCM 140A and 140B or the CPE 110 or 120, may determine whether approval has been given by a sending party(s) to store the incoming communication information packets. If not, then at step 409 the system will collect only outgoing communication packets.

However, if one or more parties to the communication session approve of his/her outgoing communication information packets being stored by a receiving party, then at step 406 the system will collect communication packets for outgoing communication information packets and for any incoming communication information packets which have been approved for collection and storage. Approval to save incoming communication information packets my come in the form of one of at least two types: pre-approval to collect the communication information packets and store them unprotected or pre-approval to collect the communication information packets and store them protected. So, at decision step 407, the system determines whether any of the approved incoming communication information packets which have been collected are to be protected. If so, then at step 408, the system protects the incoming communication information packets so that the recipient can not review the original incoming communication packets without getting additional approval from the sending party. For example, the system, e.g., PCM 140A or 140B may use cryptography software such as PGP and/or S/MIME, which may include RSA, to encrypt the communication information packets using a key known only by the sending party. One possibility is the use of symmetric keys and triple DES to encrypt. The two parties could exchange the keys using a well-known protocol for two parties to establish a communication encryption key, such as the Diffie_Hellman protocol. Then, the recipient of the incoming communication information packets may subsequently request the sending party's approval to access the complete communication session. In response, the sending party may provide the receiving party with an encryption key to decode the encrypted incoming communication information packets. Alternatively, the system might automatically save all incoming communication information packets in encrypted format without any pre-approval by the sending party. In any case, the collected communication information packets may be stored by, for example, the PCM 140A or 140B, or CPE 110 or 120. A few examples are provided below.

In one exemplary embodiment, the PCM 140A or 140B may collect and store less than all parts of a multi-party communication session when one of the parties does not give approval for his/her contribution to the communication session to be recorded. For example, the stored content of a telephone conversation may be limited to only the words of the calling party or called party (both parties may record his/her own side of the communication) if one or more of the parties to the telephone call will not agree to the storing of his portion of the conversation. In this case, the personal communication module 140A or 140B will store only information packets, e.g., IP packets, which are outbound from the party's own communication device, e.g., CPE 110 or 120, respectively. Thus, the user would build a record in his/her own database which contains only his/her side of the communication session.

In a further variation of this embodiment, a mechanism may be included to allow users to record more than just the outgoing part of a communication session, e.g., a multi-party or conference telephone call, or all parts of a communication session, e.g., a two-party telephone call, by getting permission from the other party or parties to the communication session. Often, the law requires that a party must be notified if a communication session, e.g., a telephone conversation, is being recorded (i.e., stored in memory). In such cases the present embodiment provides a mechanism that enables control of a parties approval to record the telephone call. In a first approach for a two-party telephone call, each party can initially enter an approval code which enables the system, for example the personal communications module, to store both sides (incoming and outgoing parts) of the telephone call from the very beginning of the call. This approval code may be spoken and determined with voice/speech recognition or entered via a keyboard or keypad on a communication device. In another approach, both legs of the two-way telephone call are collected and stored in, for example, a database, one unprotected (voice segments of an originating party) and one protected (voice segments from some other party). In this case, the digitized and packetized voice (i.e., words spoken) of the party originating the communication, for example the party having PCM 140A associated with his/her CPE 110, are stored in an unprotected manner. However, the digitized and packetized voice (i.e., words spoken) received by that same party from the other party to the telephone call, for example the party having PCM 140B associated with his/her CPE 120, are encoded using encryption, and the party originating these words (the party having PCM 140B associated with his/her CPE 120) may be given the only copy of the encryption key for decoding the encrypted information packets. If at some point, the system user having CPE 110 and PCM 140A wishes to recall the other side's portion of the telephone call, he can request the key from the other party, and therewith decode the encrypted portion of the telephone conversation. A similar scenario would apply to a conference call but each party could approve whether his portion of the conversation may be collected and saved by one or more recipients. Thus, an entire communication session, for example a telephone call, may be retained in an indexed database of personal communications and either some, all, or none of the various parts or sides of the incoming communication packets for the telephone call may be unprotect, depending on each parties' preference.

In a still further variation of the invention, the PCM may include an interactive portion which enables the user to actively or interactively determine particular keywords that he/she may later use to search and find a stored communication session. After each communication session, the user may be given, either automatically or manually, the choice to enter keywords or make corrections to the keywords initially selected by the indexed database system, so as to assist in indexing the communication session. Once a communication session is saved in the database and the keywords and/or meta data established, the user may search it whenever he/she wishes to review something in or about a conversation that he/she previously had with another party. This feature may be achieve by, for example, using a voice synthesis system within the PCM 140A or 140B and having user voice response or keypad entry to select various options or enter alternative keywords or ID terms. Alternatively, it may be achieved by including a graphical user interface (GUI) to allow the system user to view system selected keywords and select or manually enter his preferred keywords and ID terms.

Figure 5:
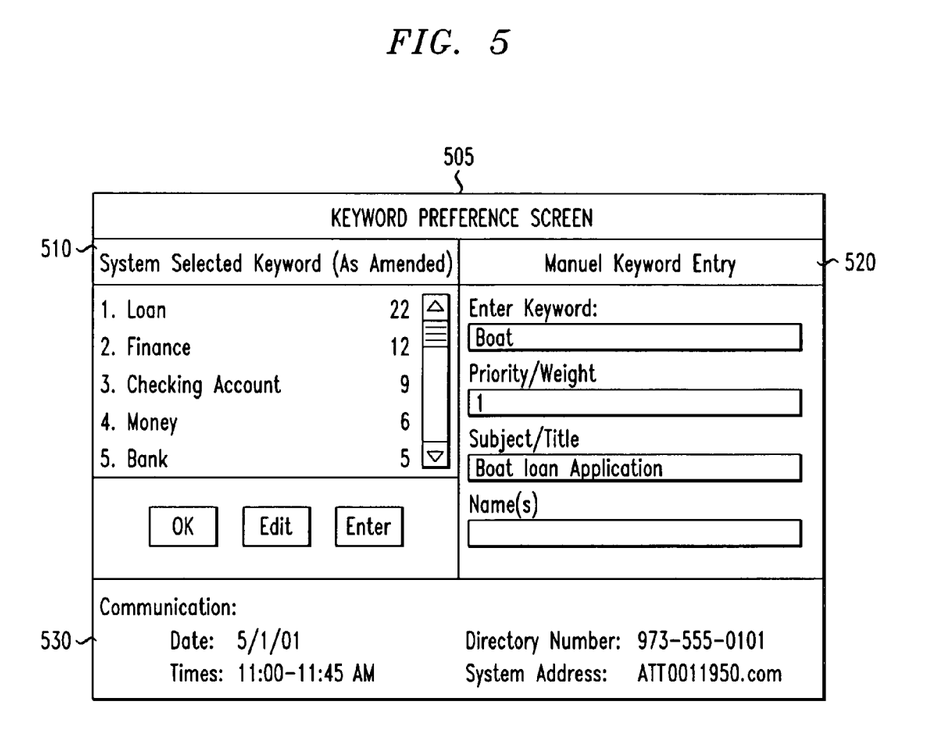
FIG. 5 shows an exemplary graphical user interface for system indication and user selection of keywords and/or ID terms related to a communication session according to a preferred embodiment of the present invention.

Referring to FIG. 5 an exemplary graphical user interface 505 for system indication and user selection of keywords and/or ID terms related to a communication session according to a preferred embodiment of the present invention is provided. The keyword preference screen GUI 505 may have three primary areas, a system selected keyword section 510, a manual keyword entry section 520 and a communication session identification information section 530. The system selected keyword section 510 may include, for example, a listing of the top five or more keywords as listed according to the number of occurrences of the keywords in the communication session. This listing may be edited and revised as the user prefers. The manual keyword entry section 520 enables the user to input his/her preferred keywords or ID terms and may include the ability to enter a title for the communication session or the identity of one or more persons involved in the communication session. The communication session identification information section 530 may include various types of meta information such as the date and times of the communication session and the directory number and/or system address of the communication session. This information may be updated. The GUI 505 or any portion(s) of the GUI 505 may be presented on a CPE 110, for example the PC 114 or the TV 118, or on the display of a mobile communication device 155.

Figure 6:
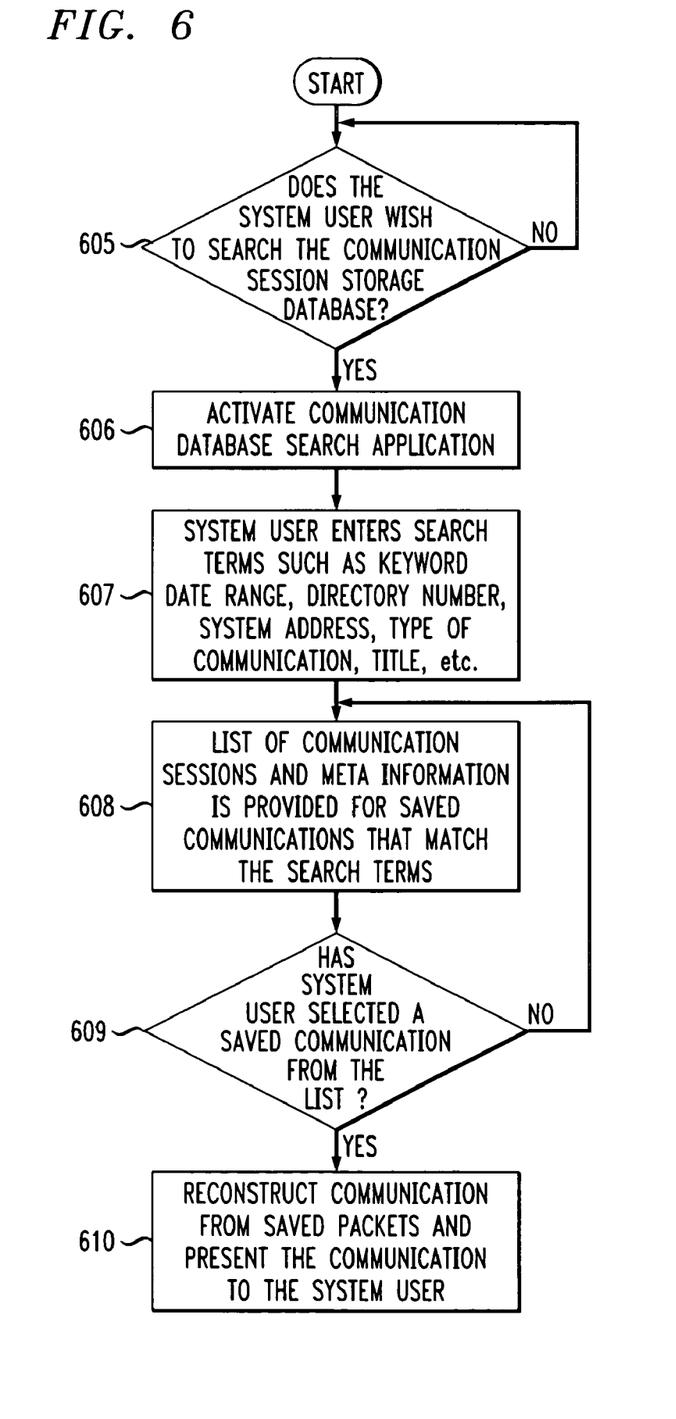
FIG. 6 shows a flow diagram for searching a database of communication session to find a communication session the user wishes to review according to a preferred embodiment of the present invention.

Once the system has stored a plurality of communication sessions with related information in, for example, a database on a disk in the PCM 140 or 140B, the system user may search the database and identify one or more stored communication session to review. FIG. 6 shows a flow diagram for searching a database of communication session to find a communication session the user wishes to review according to one preferred embodiment of the present invention. First, the system determines if the system user would like to search the communication session database at decision step 605. If so, then at step 606 the system activates the communication session database search application. This search application may be provided with custom software which enables the system user to enter search terms and view a listing of the communication session stored in memory or on disk which meet or closely meet the search terms entered by the system user. The means for initiating the search application, entering the search terms, and reviewing the search results may be, for example, a keypad, keyboard, voice recognition, or touch screen with system responses via a screen display or voice synthesis system. These means may be contained within, for example, the PCM 140A or 140B or the CPE 110 or 120, the BTI 112 or 122, or the PC 114 or 124.

Figure 7:
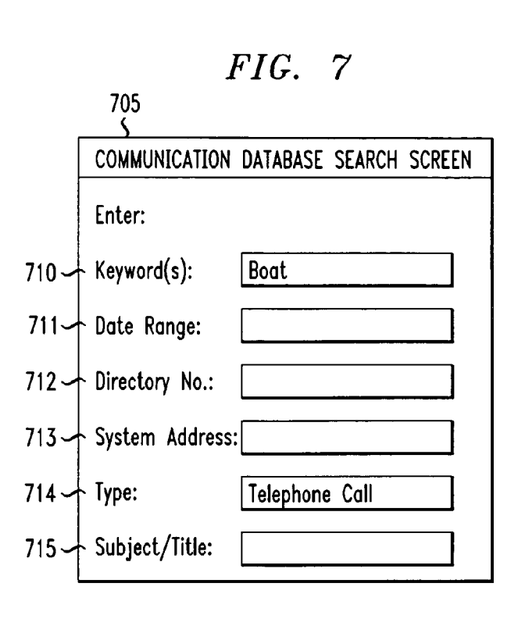
FIG. 7 shows an exemplary graphical user interface used to search a database system to find a communication session the user wishes to review according to a preferred embodiment of the present invention.
Figure 8:
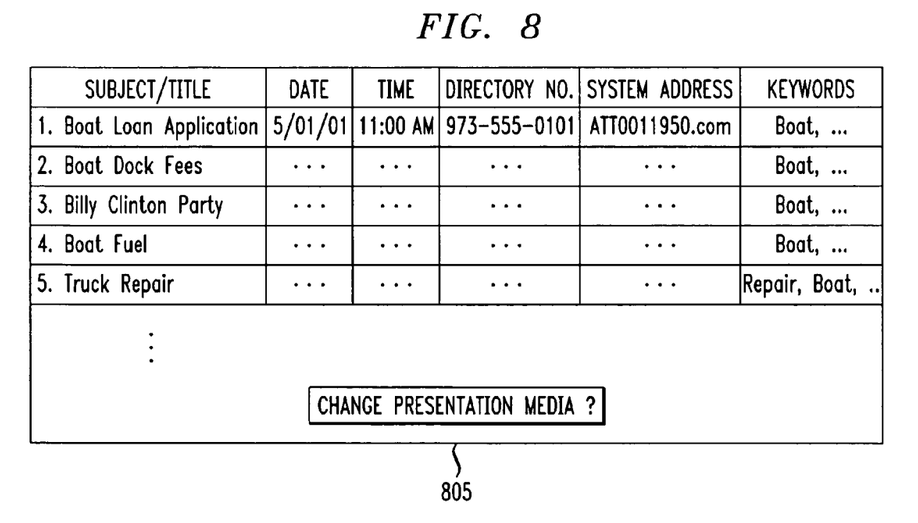
FIG. 8 shows an exemplary result of a listing of communication sessions identified in response to a system user's request according to a preferred embodiment of the present invention.

Then, at step 607, the system user may enter one or more search terms such as a keyword, date range, directory number, system address, type of communication, title, etc. The entry of the search request information may be made via a keypad, keyboard, touch screen, and/or graphical user interface with, for example, a telephone 113, PC 114, TV 118, and/or mobile communication device 155. FIG. 7 shows one exemplary graphical user interface used to search a communication session database to find a communication session that has the keyword "boat" in it and is a telephone call. The communications database search screen 705 GUI may include entry fields such as keyword(s) 710, date range 711, directory number 712, system address 713, type (of communication) 714, and subject/title 715. In response, the system lists the communications and related meta information for the saved communication sessions that match the search terms at step 608. FIG. 8 shows one exemplary result of a listing of communication sessions identified in response to a system user's request illustrated in FIG. 7. Then, at decision step 609, the system determines whether the system user has selected a saved communication session from the list for review. If so, at step 610 the system, for example the PCM 140A or 140B or the CPE 110 or 120, reconstructs the communication from the saved packets and presents the communication session to the system user. The communication would typically be presented in the media in which it originated. However, the system user can specify, and the system will provide, the communication session to be presented for review in an alternate media. For example, the system user may select that a communication session which originated as voice in a telephone call be presented as text.

Although particular embodiments of the present invention have been shown and described, it will be understood that it is not intended to limit the invention to the preferred embodiment(s) and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims.

For example, the present invention is applicable to communication sessions in which one or more parties are located off network and one party is on network or when all parties are off network but the communication session is transported at least in part, through a broadband network such as the Internet or an ATM network. For example, if one party to a telephone conversation is using POTS telephone 180 coupled to PSTN 160, a second party to the telephone conversation is using a mobile telephone coupled to the PSTN 160 through a cellular telephone network 150, and a third party is using a POTS telephone 113 coupled to his BTI 112 and PCM 140A, then the call is routed through broadband network 130 and gateway 160 such that the voice communication is digitized and packetized within a portion of the transmission path. As such, the third party can save the communication session (all parties words with the approval of the first and second party) to, for example, his PCM and search and review it according to the present invention. Alternatively, all parties to the telephone conversation could be off network and the call could be routed through the broadband network 130. In this case, one or more of the parties could subscribe to a communication session storage service and, for example, a server on the broadband network could maintain the system subscriber's assigned PCM 140A. This embodiment is particularly attractive to a party who uses a mobile communication device as his/her only or primary communication means.

All publications, patents, and patent applications cited herein are hereby incorporated by reference in their entirety for all purposes.

What is claimed is:

1. A method comprising the steps of:
    a customer at a telecommunication instrument establishing a substantially real-time communication session with a remote party, said communication entity that enables session consisting of communication originating from the customer and communication originating from the remote party including one or more of voice, audio and video, and instant messaging;
    said customer requesting authorization code from said remote party to record said communication that originates from said remote party;
    when a code is provided by said remote party, pursuant to said customer's request storing said communication originating from said remote party in a memory, and in association therewith storing said code;
    after termination of said communication session, developing a set of keywords for indexing the stored communication by
       (a) providing to said customer an opportunity to enter said keywords,
       (b) providing to said customer an opportunity to make changes to system-selected keywords, or
       (c) applying an artificial intelligence process to select keywords from the stored communication; and
    indexing the stored communication in a database based on said set of keywords.

2. The method of claim 1 where said communication that originates from said remote party is stored in encrypted form, and said method further comprises a step of sending to the remote party a decryption key for decrypting the encrypted and stored communication.

3. The method of claim 1 further comprising a step of storing in said database communication originating by said customer.

4. The method of claim 1 further comprising the steps of
    searching said database based on one or more of said keywords or based on said system-selected words to identify a communication session that is stored in said database; and
    retrieving the identified communication session.

5. The method of claim 1 where said remote party is a person and said communication originating from said remote party is live communication.

6. A method comprising the steps of:
    establishing a communication session between a first person and a second person via a telecommunication network, said communication session comprising speech originating from said first person and speech originating from said second person;
    said first requesting from said second person an authorization code to serve as permission to store said speech from said second person;
    only if said second person provides said authorization code,
       (a) storing said speech from said second person in a memory, and in association therewith storing said authorization code; and
       (b) after termination of said communication session, developing a set of keywords for indexing the stored speech of the terminates communication session by
          1. providing to said first person an opportunity to choose said keywords,
          2. providing to said customer an opportunity to make changes keywords selected by a processor that has access to the stored speech, or
          3. said processor executing an artificial intelligence process to select keywords from the stored speech; and
       (c) indexing the stored speech in a database, based on said set of keywords.

7. The method of claim 6 where said second person is unconstrained in choosing said authorization code.

* * * * *